US011442715B1

(12) United States Patent
Bilenko

(10) Patent No.: US 11,442,715 B1
(45) Date of Patent: Sep. 13, 2022

(54) ASYNCHRONOUS FRAMEWORK

(71) Applicant: Seagate Technology LLC, Fremont, CA (US)

(72) Inventor: Anatolii Bilenko, Kyiv (UA)

(73) Assignee: Seagate Technology LLC, Fremont, CA (US)

( * ) Notice: Subject to any disclaimer, the term of this patent is extended or adjusted under 35 U.S.C. 154(b) by 17 days.

(21) Appl. No.: 16/916,063

(22) Filed: Jun. 29, 2020

(51) Int. Cl.
*G06F 8/41* (2018.01)
*G06F 8/30* (2018.01)

(52) U.S. Cl.
CPC .............. *G06F 8/458* (2013.01); *G06F 8/30* (2013.01); *G06F 8/433* (2013.01); *G06F 8/447* (2013.01)

(58) Field of Classification Search
CPC .................................... G06F 8/458; G06F 8/30
USPC ................................................. 717/140–167
See application file for complete search history.

(56) References Cited

U.S. PATENT DOCUMENTS

| 7,203,926 | B2 * | 4/2007 | Bogle ................. G06F 9/45512 714/E11.21 |
| 7,248,603 | B1 * | 7/2007 | Grunkemeyer ......... G06F 9/547 370/466 |
| 9,411,568 | B2 | 8/2016 | Syme et al. |
| 2005/0246692 | A1 * | 11/2005 | Poteryakhin ............ G06F 8/458 717/140 |
| 2008/0184210 | A1 * | 7/2008 | Lee ....................... G06F 8/4434 717/136 |
| 2010/0313184 | A1 | 12/2010 | Gustafsson et al. |
| 2011/0173595 | A1 | 7/2011 | Gustafsson et al. |
| 2021/0055916 | A1 * | 2/2021 | Wu ........................ G06F 3/0482 |

OTHER PUBLICATIONS

Schafer, Timm, Alexander Knapp, and Stephan Merz. "Model checking UML state machines and collaborations." Electronic Notes in Theoretical Computer Science 55.3 (2001): pp. 1-6. (Year: 2001).*
Syme, Don, Tomas Petricek, and Dmitry Lomov. "The F# asynchronous programming model." International Symposium on Practical Aspects of Declarative Languages. Springer, Berlin, Heidelberg, 2011.pp.1-15 (Year: 2011).*
Kasten, Oliver, and Kay Romer. "Beyond event handlers: Programming wireless sensors with attributed state machines." IPSN 2005. Fourth International Symposium on Information Processing in Sensor Networks, 2005.. IEEE, 2005.pp.45-52 (Year: 2005).*
Krstic, Milos, et al. "Globally asynchronous, locally synchronous circuits: Overview and outlook." IEEE Design & Test of computers 24.5 (2007): pp. 430-441. (Year: 2007).*
Czaplicki, Evan, and Stephen Chong. "Asynchronous functional reactive programming for GUIs." ACM SIGPLAN Notices 48.6 (2013): pp. 411-422. (Year: 2013).*
Schrock, Eric. "Debugging AJAX in production." Communications of the ACM 52.5 (2009): pp. 57-60. (Year: 2009).*

* cited by examiner

*Primary Examiner* — Satish Rampuria
(74) *Attorney, Agent, or Firm* — Mueting Raasch Group

(57) ABSTRACT

A framework, method, and system for generating asynchronous code from state machines coded in a synchronous manner are described. The code is pre-processed into asynchronous code based on the framework prior to compilation thereof. The framework may include various structures and functions such as a save structure, a reentry function, a block wrapping function and a yield identification function.

19 Claims, 6 Drawing Sheets

ASYNCHRONOUS FRAMEWORK

The disclosure herein relates to a framework for generating asynchronous programming code from state machines coded in a synchronous manner, and further to methods and systems for generating asynchronous programming code using the framework.

SUMMARY

One illustrative method of compiling code may include providing a framework to generate asynchronous programming code comprising: a save structure to save a present state of a state machine coded in a synchronous manner; a reentry function to restore the present state of the state machine from the save structure; a block wrapping function to wrap over potentially-blocking functions of the state machine; and a yield identification function to identify blocking points within the state machine. The illustrative method may further include providing code comprising a least one state machine coded in a synchronous manner using the framework, pre-processing the code using the framework to translate the code into asynchronous code, and compiling the asynchronous code into an executable program.

One illustrative system for use in compiling code may include a memory to store data and a computing apparatus comprising one or more processors and operably coupled to the memory. The computing apparatus may be configured to: provide a framework to generate asynchronous programming code comprising: a save structure to save a present state of a state machine coded in a synchronous manner; a reentry function to restore the present state of the state machine from the save structure; a block wrapping function to wrap over potentially-blocking functions of the state machine; and a yield identification function to identify blocking points within the state machine. The computing apparatus may be further configured to provide code comprising a least one state machine coded in a synchronous manner using the framework, pre-process the code using the framework to translate the code into asynchronous code, and compile the asynchronous code into an executable program.

One illustrative framework for use in generating asynchronous programming code may include a save structure to save a present state of a state machine coded in a synchronous manner, a reentry function to restore the present state of the state machine from the save structure, a block wrapping function to wrap over potentially-blocking functions of the state machine, and a yield identification function to identify blocking points within the state machine.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
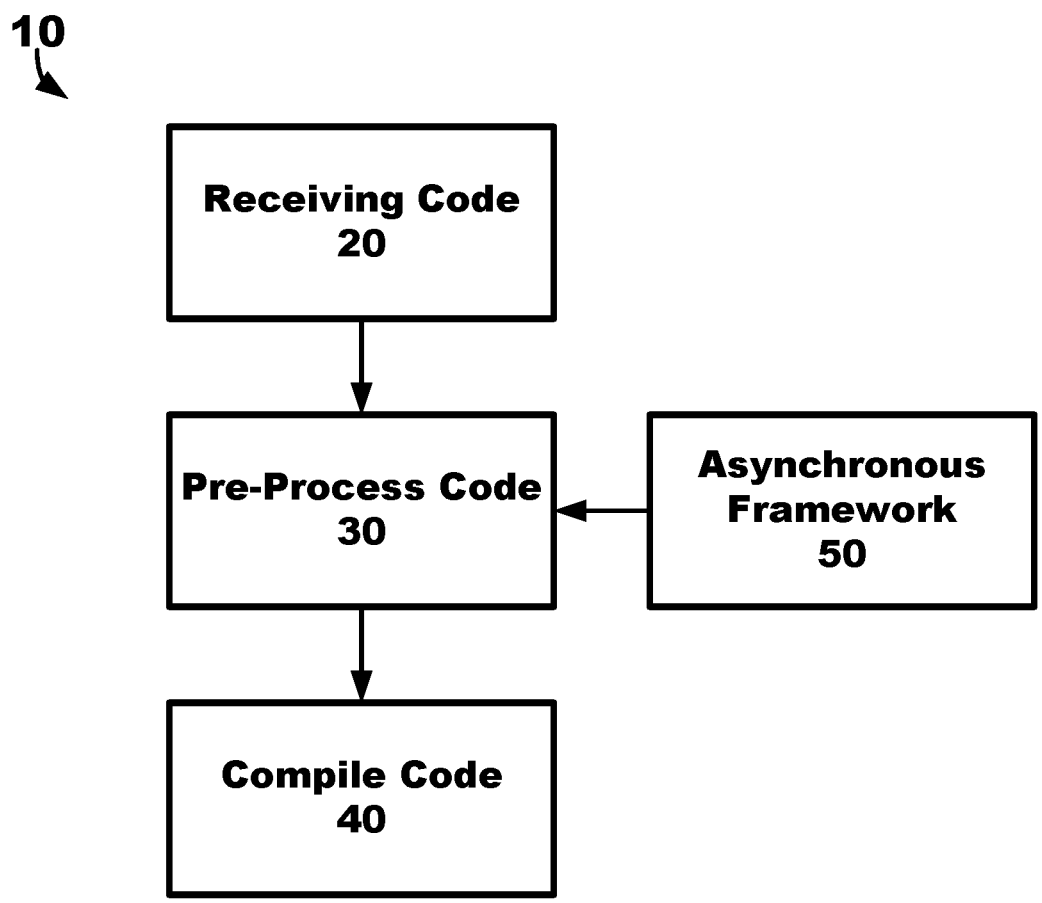
FIG. 1 is a block diagram representing an illustrative method of generating asynchronous programming code from state machines coded in a synchronous manner.

An illustrative framework, system, method, and techniques related thereto shall be described with reference to FIGS. 1-5. It will be apparent to one skilled in the art that elements or processes from one embodiment may be used in combination with elements or processes of the other embodiments, and that the possible embodiments of such framework, system, method, and techniques using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

Traditional methods of writing state machines for request processing may lead to rewriting the whole code of the project in asynchronous manner. Such code is often error prone, hard to write, read, debug, analyze, and modify. The illustrative framework, method, and system of the present disclosure may be described as being able to hide details of sophisticated stack unwinding and context saving, which may, therefore, save many man hours and can make state machine code easily readable by less experienced developers. Additionally, the illustrative framework, method, and system of the present disclosure may increase the speed of writing asynchronous code and may provide ease of modification of such asynchronous code. The illustrative framework may be described as a synchronous-alike asynchronous request processing framework is proposed. Further, using the illustrative framework, users can avoid defining states explicitly as the framework supports such coding approach, but, in cases when the user needs state definitions, such state definitions can be defined.

Additionally, before the present disclosure, context restoration for each processed request would have to be performed manually. Therefore, every developer was performing context restoration and actions related thereto in their own style, which was not unified, and thus, disadvantageous when multiple developers would work on the same code. The illustrative framework, methods, and systems of the present disclosure may be described as providing a unified technique for writing asynchronous request processing code.

In one or more embodiments, the illustrative framework, method, and system of the present disclosure may be described as being or using an asynchronous request processing framework that manages request current state including its local variables, control flow data, and other state variables, and that further provides state restoration after reentering the stack of functions coroutines are used in. Additionally, while working with the illustrative asynchronous request processing framework, users may use local on-stack variables with understanding that, after yield, their values do not have to be restored manually. Instead, using the illustrative framework, the user may only put a special macro inside the beginning of every function and inside every function in every function-stack that is being yielded. Further, restorable variables may be used like local variables and can be declared inside a special macro. Further, the restorable variables can be accessed with a special macro, which can be redefined. Still further, users may maintain the asynchronous request processing framework context inside their own structures.

Using the illustrative framework, every function, which potentially can be unwinded during yield, may be wrapped with a special macro. Further, using the illustrative framework, every place inside underlying functions wrapped by a special macro can be yielded. After this, the function stack is being unwinded up to the place in the code where top-level asynchronous processing call is being performed (which is assumed to be the nearby request processing function). Still further, using the illustrative framework, users may control execution of asynchronous framework by checking return codes of a special macro.

An illustrative method 10 of generating asynchronous programming code from state machines coded in a synchronous manner is depicted in FIG. 1. The method 10 may include receiving code 20. The received code may include a least one state machine (or one or more state machines) written in a synchronous manner using the illustrative asynchronous framework 50 described herein. The method 10 may further include pre-processing the code 30 using the illustrative asynchronous framework 50 prior to compiling the code. In other words, the code may be modified, or adjusted, using the illustrative asynchronous framework 50 without compiling the code into an executive binary file. In one or more embodiments, the pre-processing of the code using the illustrative framework may include isolating memory allocations in the code. In other words, the illustrative framework does not provide memory allocations during operation or runtime, and instead, the illustrative framework provides all needed allocations, which are isolated in the pre-processing or initialization step.

After the code has been pre-processed 30, the code may be compiled 40 into an executive program or binary file. In one or more embodiments, after the code has been compiled in an executable program, the executable program may be executed in a runtime environment that does not support synchronous code (since the code was pre-processed from synchronous code to asynchronous code prior to compiling).

For the sake of optimal CPU utilization by means of minimization of context switches and locality of reference optimization, modern request processing frameworks may utilize a "Thread Pool" plus "Event Loop model" similar to cooperative threading models. Minimization of context switches mostly rely on non-blocking behavior, which affects the structure and logic of the request processing framework because requests in such conditions have to be associated with their state machines and request processing logic is typically encapsulated into a kind of function. When one of threads living in a thread pool retrieves one of such requests from its internal queue, the thread runs request processing logic and moves the request state machine from state to state. To reach non-blocking behavior practically, request state machines have to be structured to include states that arm long operations (indicated in the examples provided herein with an asterisk*) such as, e.g., disk input/output, network send/receive, resource acquisition, etc. and states that process the result of completion (indicated in the examples provided herein with an double asterisk**).

Figure 2:
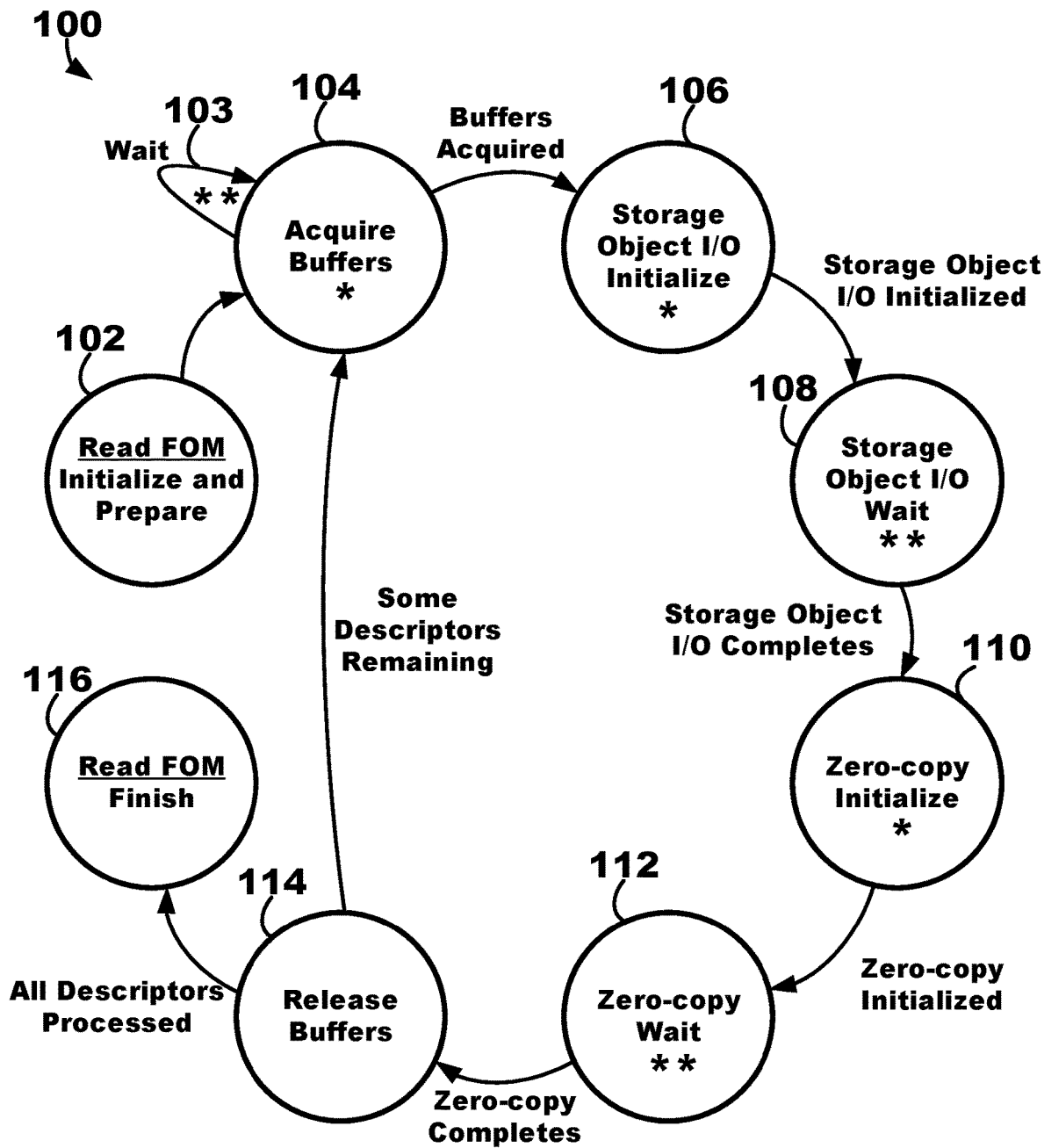
FIG. 2 is a state diagram of an illustrative file operation machine (FOM) for input/output requests.

A state diagram of an illustrative file operation machine (FOM) 100 for input/output requests is depicted in FIG. 2. The FOM may be a read request, and the first state may be an initialize and prepare state 102. The next state is an acquire buffers for the read request state 104, which may be a potential blocking point as indicated by the single asterisk*. In particular, the acquire buffers state 104 may be referred to as an arming state and the wait loop or arc 103 extending therefrom and back again may be the state processing the result of the completion as indicated by the double asterisk**. In other words, the loop 103 may be a blocking point. After the buffers have been acquired, a storage object input/output (I/O) may be initialized 106, which is also an arming state. While the storage object I/O is being initialized, the storage object I/O wait state 108, which is the state processing the completion, is performed. After the storage object I/O is completed, the zero-copy initialize state 110, which is also an arming state, may execute, and until the zero-copy initialize state is completed, the zero-copy wait state 112 is executed, which is the state processing the completion. After the zero-copy is completed, the buffers may be released 114, and if all descriptors are processed, the read FOM may finish 116. If more descriptors need processing, the state machine may again acquire buffers 104.

As can be seen in FIG. 2, many blocks or blocking points may occur within the illustrative file operation machine (FOM) 100. The illustrative framework, methods, and systems may provide mechanisms to make such blocks or blocking points efficient to code and the code to provide such blocks or blocking points easy to modify and read by users.

Figure 3A:
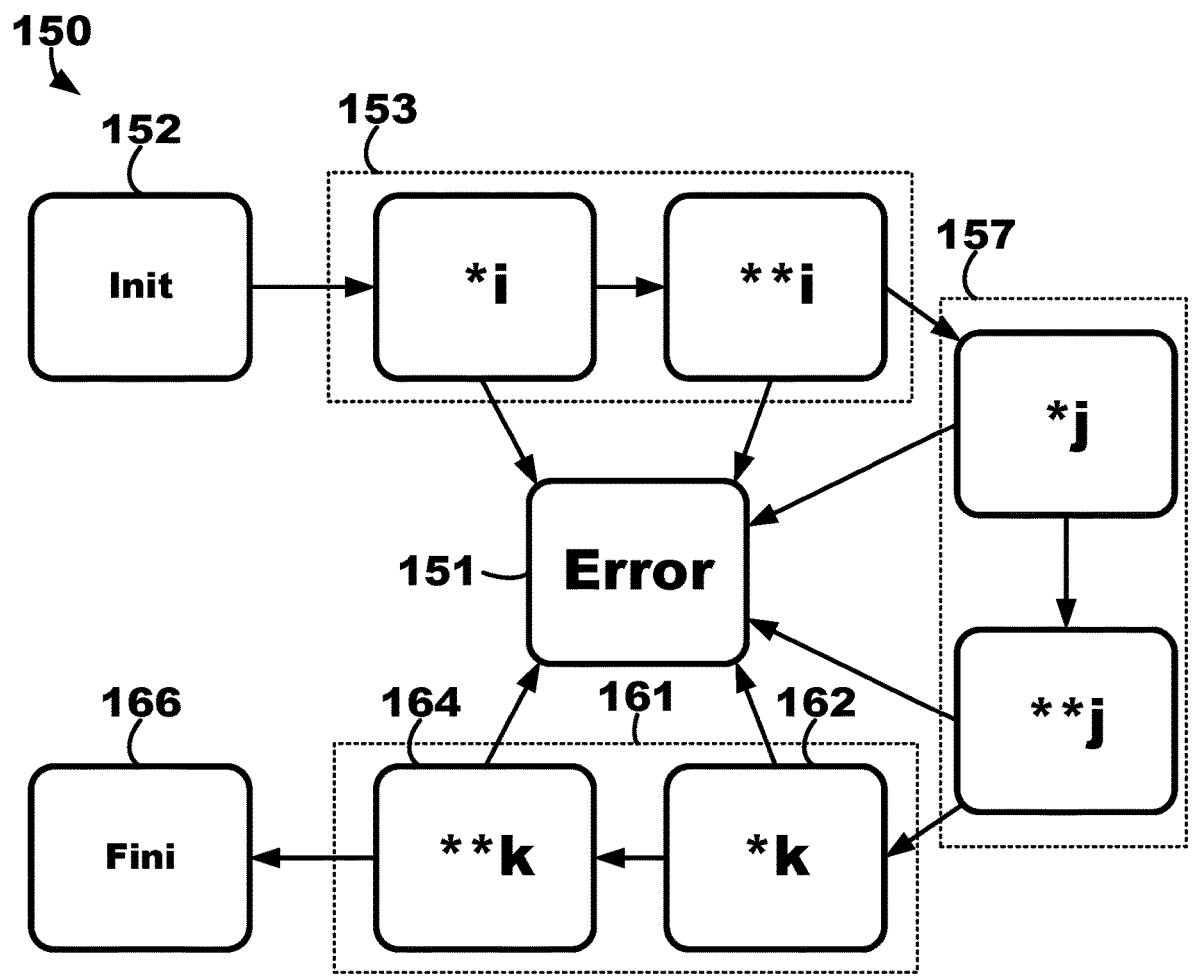
FIG. 3A is a generic state diagram of a request state machine.
Figure 3B:
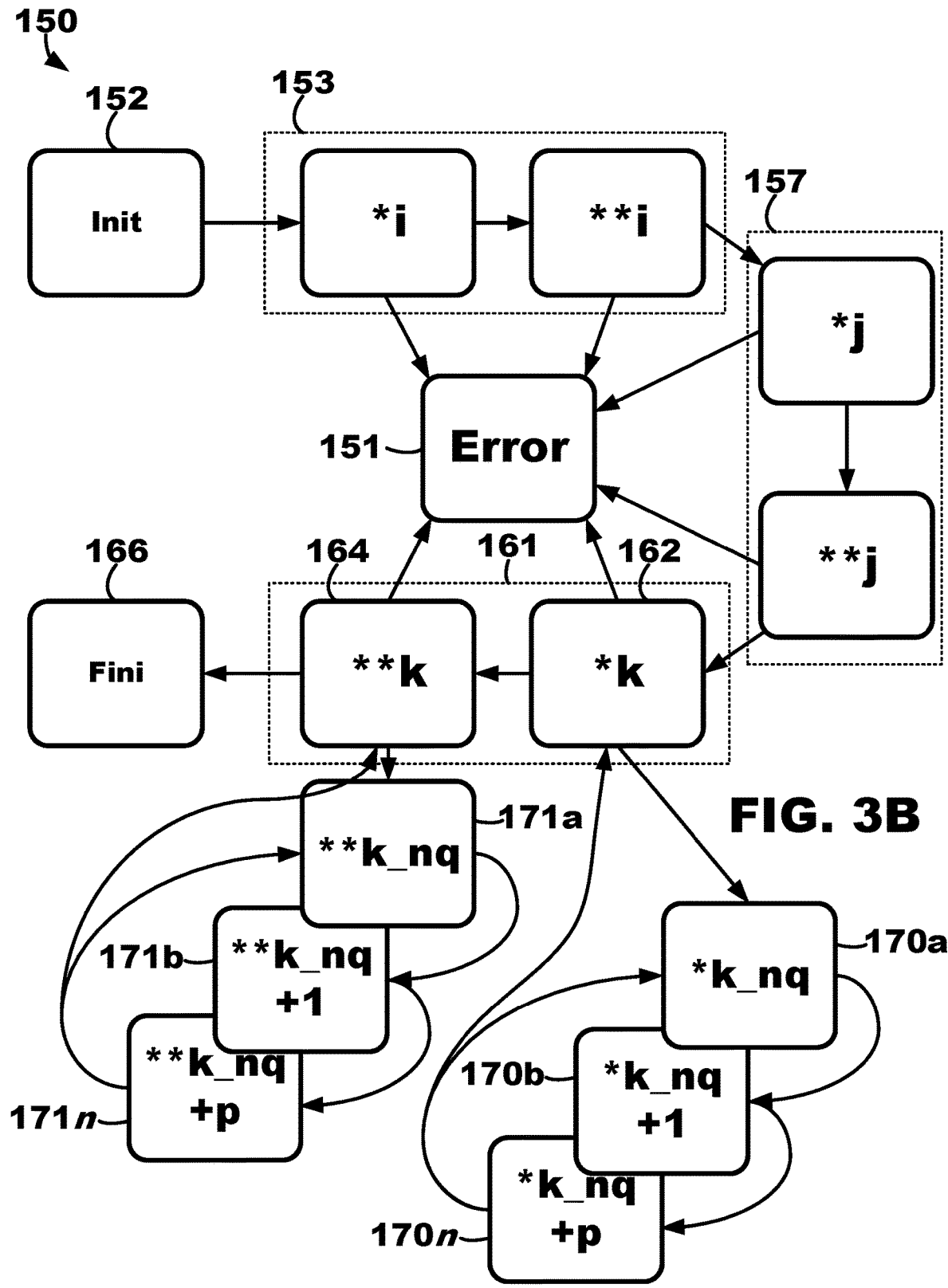
FIG. 3B is the state diagram of the request state machine of FIG. 3A further including additional states to make the request state machine non-blocking.

Another generic state diagram of a request state machine 150 is depicted in FIG. 3A. The request state machine 150 may generally initialize 152, perform three processes 153, 157, 161, and finish 166. Each of the three processes 153, 157, 161, includes an arming state as indicated by the single asterisk* and a waiting state as indicated by the double asterisk**. Additionally, each of the states may result in error 151.

In other words, a generalized approach to design request state machines implies alternation of arming (*) and completion processing (**) states and specific states as shown in FIG. 3A, where the chain of transitions *i→**i→*j→**j→*k→**k is shown. As it can be seen, the structure of such state machines would have to be designed thoroughly, to account every detail of application design because they have a very high cost of modification. On the other hand, it would likely be quite difficult to read such code, especially after several years of maintenance because it tends to grow up uncontrollably fast.

Assume that a requirement is obtained which makes request processing logic to use blocking operation. For example, a resource that is being used becomes shared, and therefore, needs synchronization. At the initial design stage, such blocking behavior was not accounted for. Generally, two options may be pursued in such situation: (1) redesign current request processing logic and request state machine; or (2) add additional states into state machine and extend processing logic. In the second approach, to make each blocking call unblocking, additional states 170a . . . 170n, 171a . . . 171n will need to be added into each request state machine as show for the state machines 162, 164 of process 161 in FIG. 3B.

Many states may need to be added in such situations. For example, one extra state will need to be added for each loop with a blocking call (BC). Further, for example, one extra state will need to be added for each condition with a BC. Still further, for example, one extra state will need to be added for a top-level function with BC. And further, for example, one extra state will need to be added for each nest function with BC. Thus, modification of such a code can lead to addition of multiple states thereby increasing development and maintenance effort. The cost of such effort may depend on lines of code base and number on newly introduced blocking calls. In particular, for example, various requirements would have to be met such as, e.g. clear context preemption nearby multiple blocking points, including locks, allocation, I/O, and; system calls, consecutive waits for multiple asynchronous operations, and/or error and result handling and propagation.

Figure 4:
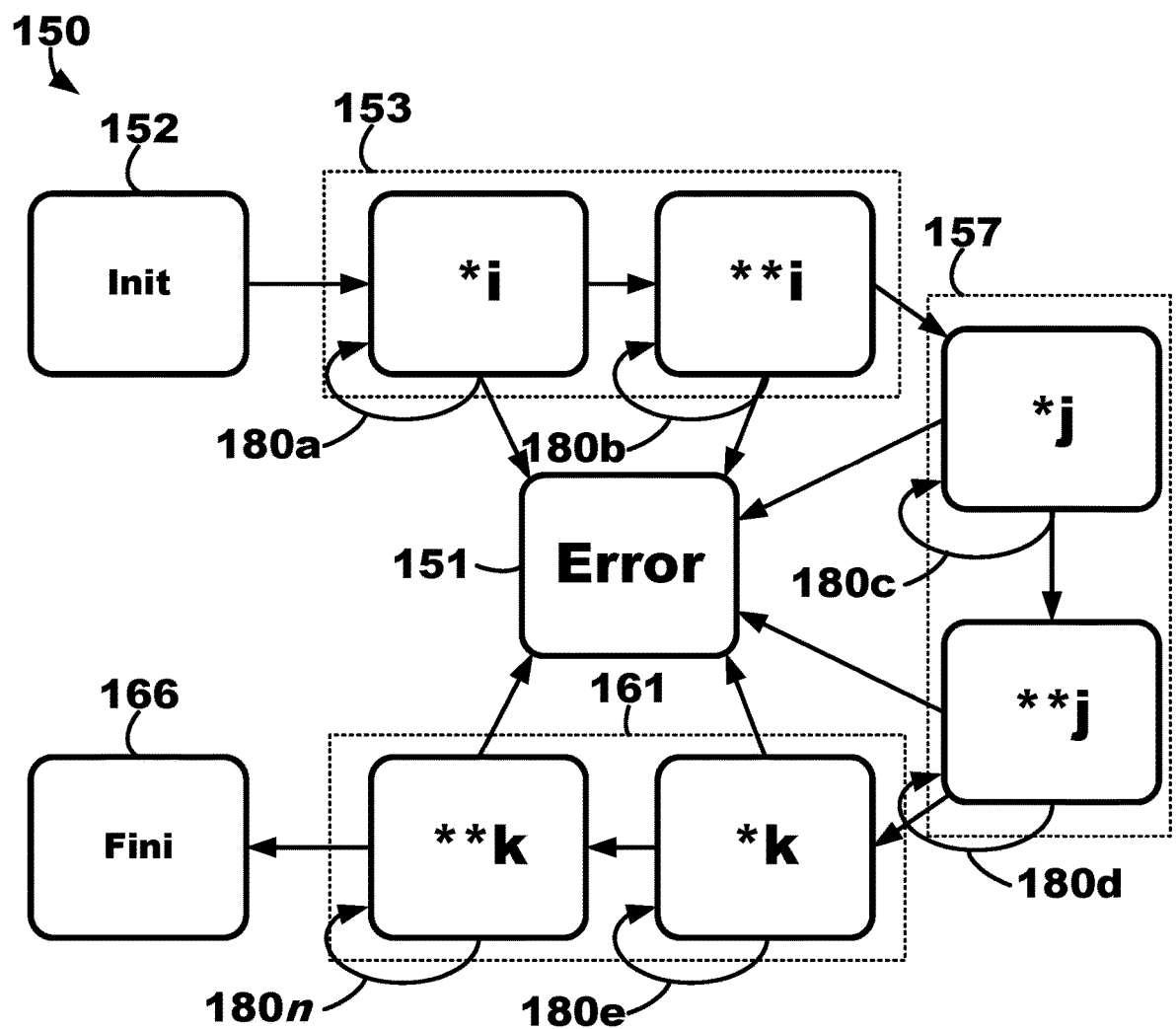
FIG. 4 is the state diagram of the request state machine of FIG. 3A further including additional arcs using the illustrative framework according to the present disclosure to make the request state machine non-blocking.

As an alternative to such approaches, one may utilize the illustrative framework described herein, which does not allow introduction of additional states but only adds loops or arcs 180a . . . 180n into request state machine as graphically represented in the state machine 150 depicted in FIG. 4. In other words, the state diagram 150 of the request state machine of FIG. 3A further including additional arcs using the illustrative framework according to the present disclosure to make the request state machine non-blocking is depicted in FIG. 4. Request processing logic has to be changed in such a way that every blocking function has to be "instrumented" with a special macro using the illustrative framework as described herein.

As described herein with respect to FIG. 1, the illustrative framework may be used to pre-process code to translate the code into asynchronous code 30 prior to compiling the now, asynchronous code into an executable 40. The illustrative framework may include one or more or a plurality of structures and functions to provide the functionality described herein.

In one embodiment, the illustrative framework may include a save structure to save a present state of a state machine coded in a synchronous manner. The save structure may be configured, or setup, to save the current states, including coroutine local variables, control flow data, and/or any other state variables with respect to restoring the state after reentering the stack of functions coroutines are used therein. A user can use the save structure when writing synchronous code, which can then be pre-processed into synchronous code using the illustrative framework.

Further, the illustrative framework may include a reentry function to restore the present state of the state machine from the save structure. The reentry function may allow declaration of one or more variables to be saved by the save structure upon a yield of the state machine. Thus, a user may use restorable variables with the synchronous code like local variables and can be declared inside the macro. Then, such synchronous code can be pre-processed into asynchronous code using the illustrative framework.

Still further, the illustrative framework may include a block wrapping function to wrap over potentially-blocking functions of the state machine written in a synchronous manner. Thus, a user may use the block wrapping function to wrap functions that can block, and during pre-processing, the framework will generate asynchronous code therefrom.

Yet still further, the illustrative framework may include a yield identification function to identify blocking points within the state machine coded in a synchronous manner. Thus, a user may use the yield identification function to point out, or identify, blocking points within synchronously coded state machines, and during pre-processing, the framework will generate asynchronous code therefrom. In other words, the yield identification function may be used to define blocking points.

The one or more or a plurality of structures and functions of the illustrative framework may be included in a code, or software, library. Thus, the illustrative framework can be included in code, and the structures and functions can be used in such code. In one or more embodiments, the illustrative framework, which can be a library, may be coded in the C or C++ program language. Thus, the illustrative framework may be C or C++ programming language library.

The illustrative framework described herein may be advantageous for many reasons. For example, the illustrative framework may support different threading models for request processing as opposed to native threading models (such as those using hardware stacks and in Python-related functionality). Further, for example, the illustrative framework may support preemption from every nested function. Still further, for example, the illustrative framework may be provided as a language independent library as opposed to a language part. Thus, the illustrative framework can be used in across multiple languages and can be ported to various languages such as C++. And still further, for example, the illustrative framework can easily coexist with traditional state machines and continuation passing style while previous functionality may be difficult to mix with traditional state machines.

Figure 5:
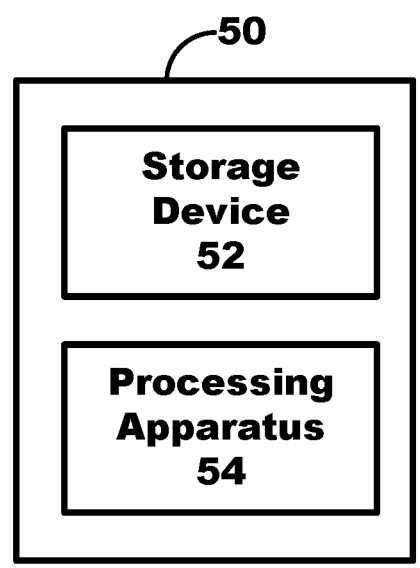
FIG. 5 is block diagram of an illustrative system for use generating asynchronous programming code from state machines coded in a synchronous manner.

The illustrative framework, method, and techniques described herein may be implemented and/or executed using the system of FIG. 5. The system 50 include at least one storage device 52 and at least one processing apparatus, or processor, 54 that are operably coupled (e.g., electrically coupled to transmit data therebetween) to each other. The at least one storage device 52 may be any device and/or apparatus configured to store a plurality of data blocks, or tracks of data, (e.g., binary data). The at least one storage device 52 can include, but is not necessarily limited to, solid state memory, hard magnetic discs, floppy discs, magnetic tapes, optical discs, integrated circuits, volatile memory, nonvolatile memory, etc. Generally, the plurality of data blocks, or blocks of data, of the storage devices 52 may be contained in non-volatile memory.

Non-volatile memory may include any kind of computer memory that can retain information stored thereon when not powered. Examples of non-volatile memory that may be utilized as the non-volatile main memory include, but are not limited to, read only memory (ROM), flash memory, hard drives, and random-access memory (RAM). Examples of ROM include, but are not limited to, programmable ROM (PROM) which can also be referred to as field programmable ROM; electrically erasable programmable ROM (EEPROM) which is also referred to as electrically alterable ROM (EAROM); and erasable programmable ROM (EPROM). Examples of RAM include, but are not limited to, ferroelectric RAM (FeRAM or FRAM); magnetoresistive RAM (MRAM); resistive RAM (RRAM); non-volatile static RAM (nvSRAM); battery backed static RAM (BBSRAM); phase change memory (PCM) which is also referred to as PRAM, PCRAM and C-RAM; programmable metallization cell (PMC) which is also referred to as conductive-bridging RAM or CBRAM; nano-RAM (NRAM), spin torque transfer RAM (STTRAM) which is also referred to as STRAM; and Silicon-Oxide-Nitride-Oxide-Silicon (SONOS), which is similar to flash RAM. In at least one embodiment, the at least one storage device 52 may include one or more magnetic discs.

The at least one processing apparatus 54 may include various circuitry, logic, memory, etc. for use in the reading, writing, and decoding data from the at least one storage device 52. For example, the at least one processor 54 may include one or more circuit components such as integrated circuits, processors, etc. that may be configured to interface with the at least one storage device 52 to read and write data therein, write and compile code, execute code, process requests, etc. The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

A computer program listing appendix is submitted by EFS-Web in three text files. All material in the three files is incorporated by reference herein. The computer program listing appendix includes 1) a plain-text file that includes an illustrative example of an illustrative framework entitled Illustrative-Framework.txt, dated Nov. 9, 2021, with a file size of 11,049 bytes, 2) a plain-text file that includes an example of using the illustrative example of the illustrative framework entitled Sample1.txt, dated Nov. 9, 2021, with a file size of 2,759 bytes, and 3) a plain-text file that includes another example of using the illustrative example of the illustrative framework entitled Sample2.txt, dated Nov. 9, 2021, with a file size of 3,069 bytes. The three text files are Microsoft Windows (or DOS) compatible ASCII-encoded files in IBM-PC machine format which may be opened with a plain text editor such as Microsoft WordPad. The files use standard line terminators (ASCII Carriage Return plus Line Feed), are not dependent on control characters or codes which are not defined in the ASCII character set, and are not compressed.

Examples

One illustrative example of the illustrative framework is provided in the computer program listing appendix file entitled Illustrative-Framework.txt.

An example of using such illustrative framework to design asynchronous code are presented in code samples 1 and 2 provided in the computer program listing appendix files entitled Sample1.txt and Sample2.txt respectively. The illustrative samples define a part of B-tree algorithm related to insertion of multiple keys and values. Traditional approaches may assume that all blocking points will be defined as a state (ALLOC_WAIT_KEY_N, ALLOC_WAIT_KEY_N, INSERT_SPLIT_KV_DONE, INSERT_MERGE_KV_DONE). Loops over inserted keys and values are expressed as transitions from corresponding arming and waiting state (ex: ALLOC_KEY_N→ALLOC_WAIT_KEY_N). Error handling is performed as a dedicated state. Unlike traditional approach, proposed approach allows not to define states explicitly, loops and error handling are expressed in a synchronous manner. Instead of this for each pair or a set of pairs of states defined above new C-function is defined. To express ALLOC_KEY_N<->ALLOC_WAIT_KEY_N→ALLOC_KEY_N<->ALLOC_WAIT_KEY_N transition, allocate_kv( ) is used. The first loop (lines 10-21) in this function corresponds to ALLOC_KEY_N<->ALLOC_WAIT_KEY_N state transitions, and the second loop (lines 22-33) corresponds to ALLOC_KEY_N<->ALLOC_WAIT_KEY_N state transitions. Unlike traditional approaches, flow control will be returned back to the same line of the function after blocking operation will be completed. Blocking points in particular example marked with M0_CO_YIELD( ) macro (lines 20, 32). As can be seen, loops, conditionals, nested functions are supported seamlessly. Further, functions that might block are marked with M0_CO_FUN( ) macro. Additionally, the M0_CO constructions, as shown in theses sample, may be described as as being "easy to not to notice," and therefore, the logic of the code may be easily followed.

Embodiments of the illustrative framework, method, and system are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed:

1. A method of compiling code comprising:
providing a framework to generate asynchronous programming code comprising:
a save structure to save a present state of a state machine coded in a synchronous manner,
a reentry function to restore the present state of the state machine from the save structure,
a block wrapping function to wrap over potentially-blocking functions of the state machine, and
a yield identification function to identify blocking points within the state machine;
providing code comprising a least one state machine coded in a synchronous manner using the framework;
pre-processing the code using the framework to translate the code into asynchronous code; and
compiling the asynchronous code into an executable program.

2. The method of claim 1, wherein the save structure, the reentry function, the block wrapping function, and the yield function are included in a library.

3. The method of claim 2, wherein the library is a C programming language library.

4. The method of claim 1, wherein the present state of the state machine comprises one or more of coroutine variables and control flow data.

5. The method of claim 1, wherein the reentry function allows declaration of one or more variables to be saved by the save structure upon a yield of the state machine.

6. The method of claim 1, wherein the method further comprises executing the executable program in a runtime environment that does not support synchronous code.

7. The method of claim 1, wherein pre-processing the code using the framework to translate the code into asynchronous code further comprises isolating memory allocations in the code.

8. A system for use in compiling code comprising:
a memory to store data; and
a computing apparatus comprising one or more processors and operably coupled to the memory, the computing apparatus configured to:
provide a framework to generate asynchronous programming code comprising:
a save structure to save a present state of a state machine coded in a synchronous manner,
a reentry function to restore the present state of the state machine from the save structure,
a block wrapping function to wrap over potentially-blocking functions of the state machine, and
a yield identification function to identify blocking points within the state machine;
provide code comprising a least one state machine coded in a synchronous manner using the framework;
pre-process the code using the framework to translate the code into asynchronous code; and
compile the asynchronous code into an executable program.

9. The system of claim 8, wherein the save structure, the reentry function, the block wrapping function, and the yield function are included in a library.

10. The system of claim 9, wherein the library is a C programming language library.

11. The system of claim 8, wherein the present state of the state machine comprises one or more of coroutine variables and control flow data.

12. The system of claim 8, wherein the reentry function allows declaration of one or more variables to be saved by the save structure upon a yield of the state machine.

13. The system of claim 8, wherein the computing apparatus is further configured to executing the executable program in a runtime environment that does not support synchronous code.

14. The system of claim 1, wherein pre-processing the code using the framework to translate the code into asynchronous code further comprises isolating memory allocations in the code.

15. A framework for use in generating asynchronous programming code comprising:
a save structure to save a present state of a state machine coded in a synchronous manner;
a reentry function to restore the present state of the state machine from the save structure;
a block wrapping function to wrap over potentially-blocking functions of the state machine; and
a yield identification function to identify blocking points within the state machine;
wherein the framework is usable to provide code comprising a least one state machine coded in a synchronous manner;
wherein the save structure, the reentry function, the block wrapping function, and the yield function are usable by a pre-processing method to generate asynchronous programming code from the state machine coded in a synchronous manner;
wherein the asynchronous programming code is usable by a compiler to compile an executable program.

16. The framework of claim 15, wherein the save structure, the reentry function, the block wrapping function, and the yield function are included in a library.

17. The framework of claim 16, wherein the library is a C programming language library.

18. The framework of claim 15, wherein the present state of the state machine comprises one or more of coroutine variables and control flow data.

19. The framework of claim 15, wherein the reentry function allows declaration of one or more variables to be saved by the save structure upon a yield of the state machine.

* * * * *